United States Patent
Kuhn (10) Patent No.: US 8,760,339 B2
(45) Date of Patent: *Jun. 24, 2014

(54) WIRELESS CONNECTIVITY IN A RADAR DETECTOR

(71) Applicant: Escort Inc., West Chester, OH (US)

(72) Inventor: John Kuhn, Cincinnati, OH (US)

(73) Assignee: Escort Inc., West Chester, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/763,855

(22) Filed: Feb. 11, 2013

(65) Prior Publication Data

US 2013/0147651 A1    Jun. 13, 2013

Related U.S. Application Data

(62) Division of application No. 12/389,978, filed on Feb. 20, 2009, now Pat. No. 8,373,588.

(51) Int. Cl.
 *G01S 7/42* (2006.01)

(52) U.S. Cl.
 USPC ............................................. 342/20; 342/176

(58) Field of Classification Search
 USPC .................................................. 342/20, 176
 See application file for complete search history.

(56) References Cited

U.S. PATENT DOCUMENTS

| | | |
|---|---|---|
| 3,793,635 A | 2/1974 | Potter |
| 4,025,920 A | 5/1977 | Reitboeck et al. |
| 4,492,952 A | 1/1985 | Miller |
| 4,539,642 A | 9/1985 | Mizuno et al. |
| 4,581,769 A | 4/1986 | Grimsley et al. |
| 4,631,542 A | 12/1986 | Grimsley |
| 4,876,527 A | 10/1989 | Oka et al. |
| 4,954,828 A | 9/1990 | Orr |
| 4,986,385 A | 1/1991 | Masaki |
| 5,038,102 A | 8/1991 | Glasheen |
| 5,049,885 A | 9/1991 | Orr |
| 5,058,698 A | 10/1991 | Yoshida et al. |
| 5,079,553 A | 1/1992 | Orr |

(Continued)

FOREIGN PATENT DOCUMENTS

| | | |
|---|---|---|
| JP | 9-027096 A | 1/1997 |
| WO | 97/08839 A2 | 3/1997 |
| WO | 00/29869 A1 | 5/2000 |

OTHER PUBLICATIONS

Murakami Shinichi, Speed Excess Alarming Device, Abstract, Japanese Publication No. 09-027096, Published Jan. 28, 1997.

(Continued)

*Primary Examiner* — Jack Keith
*Assistant Examiner* — Timothy A Brainard
(74) *Attorney, Agent, or Firm* — Wood, Herron & Evans, LLP (57) ABSTRACT

Wireless and other external connectivity technology is used in various ways to enhance or improve upon existing radar detector and police activity detection systems. External memory interfaces, such as SD cards or USB, provide external storage. Wireless interfaces such as Bluetooth, Zigbee, 802.11, and wireless personal area network communication protocols, allow a detector processor to interact wirelessly with external devices, such as a Bluetooth headset, a cellular network device providing a server connection, or toggle buttons used to indicate the presence of police activity at a current position. Further, radar detectors are upgraded to provide GPS capabilities, using the existing power/data connector of the radar detector.

11 Claims, 8 Drawing Sheets

(56) References Cited

U.S. PATENT DOCUMENTS

| | | | |
|---|---|---|---|
| 5,083,129 A | 1/1992 | Valentine et al. | |
| 5,127,487 A | 7/1992 | Yamamoto et al. | |
| 5,134,406 A | 7/1992 | Orr | |
| 5,146,226 A | 9/1992 | Valentine et al. | |
| 5,151,701 A | 9/1992 | Valentine et al. | |
| 5,153,512 A | 10/1992 | Glasheen | |
| 5,164,729 A | 11/1992 | Decker et al. | |
| 5,177,685 A | 1/1993 | Davis et al. | |
| 5,206,500 A | 4/1993 | Decker et al. | |
| 5,206,651 A | 4/1993 | Valentine et al. | |
| 5,214,793 A | 5/1993 | Conway et al. | |
| 5,250,951 A | 10/1993 | Valentine et al. | |
| 5,300,932 A | 4/1994 | Valentine et al. | |
| 5,305,007 A | 4/1994 | Orr et al. | |
| 5,347,120 A | 9/1994 | Decker et al. | |
| 5,365,055 A | 11/1994 | Decker et al. | |
| 5,400,034 A | 3/1995 | Smith | |
| 5,450,329 A | 9/1995 | Tanner | |
| 5,485,161 A | 1/1996 | Vaughn | |
| 5,504,482 A | 4/1996 | Schreder | |
| 5,515,042 A | 5/1996 | Nelson | |
| 5,530,447 A | 6/1996 | Henderson et al. | |
| 5,539,645 A | 7/1996 | Mandhyan et al. | |
| 5,559,508 A | 9/1996 | Orr et al. | |
| 5,668,554 A | 9/1997 | Orr et al. | |
| 5,815,092 A | 9/1998 | Gregg, III et al. | |
| 5,864,481 A | 1/1999 | Gross et al. | |
| 5,929,753 A | 7/1999 | Montague | |
| 5,955,973 A | 9/1999 | Anderson | |
| 5,977,884 A | 11/1999 | Ross | |
| 5,983,161 A | 11/1999 | Lemelson et al. | |
| 6,084,510 A | 7/2000 | Lemelson et al. | |
| 6,118,403 A | 9/2000 | Lang | |
| 6,201,493 B1 | 3/2001 | Silverman | |
| 6,204,798 B1 | 3/2001 | Fleming, III | |
| 6,252,544 B1 | 6/2001 | Hoffberg | |
| 6,384,776 B1 | 5/2002 | Martin | |
| 6,400,304 B1* | 6/2002 | Chubbs, III | 342/20 |
| 6,567,035 B1 | 5/2003 | Elliott | |
| 6,600,409 B2 | 7/2003 | Cohen | |
| 6,614,385 B2 | 9/2003 | Kuhn et al. | |
| 6,670,905 B1 | 12/2003 | Orr | |
| 6,718,239 B2 | 4/2004 | Rayner | |
| 6,750,785 B2 | 6/2004 | Trajkovic et al. | |
| 6,895,324 B2 | 5/2005 | Straub | |
| 6,973,377 B2 | 12/2005 | Majstorovic et al. | |
| 6,985,753 B2 | 1/2006 | Rodriguez et al. | |
| RE39,038 E | 3/2006 | Fleming, III | |
| 7,013,207 B2 | 3/2006 | Majstorovic et al. | |
| 7,023,374 B2 | 4/2006 | Jossef et al. | |
| 7,113,107 B2 | 9/2006 | Taylor | |
| 7,124,006 B2 | 10/2006 | Davidson et al. | |
| 7,183,942 B2 | 2/2007 | Rock et al. | |
| 7,248,159 B2 | 7/2007 | Smith | |
| 7,298,248 B2 | 11/2007 | Finley et al. | |
| 7,298,289 B1* | 11/2007 | Hoffberg | 340/903 |
| 7,301,494 B2 | 11/2007 | Waters | |
| 7,362,239 B2 | 4/2008 | Franczyk et al. | |
| 7,411,493 B2 | 8/2008 | Smith | |
| 7,471,236 B1 | 12/2008 | Pitt et al. | |
| RE40,653 E | 3/2009 | Fleming, III | |
| 7,764,219 B2 | 7/2010 | Pitt et al. | |
| 7,999,721 B2 | 8/2011 | Orr | |
| 8,373,588 B2* | 2/2013 | Kuhn | 342/20 |
| 2002/0022920 A1 | 2/2002 | Straub | |
| 2002/0135504 A1 | 9/2002 | Singer | |
| 2002/0152026 A1* | 10/2002 | Evans | 701/210 |
| 2003/0007261 A1* | 1/2003 | Hutzel et al. | 359/838 |
| 2003/0052797 A1 | 3/2003 | Rock et al. | |
| 2003/0081122 A1 | 5/2003 | Kirmuss | |
| 2003/0139150 A1 | 7/2003 | Rodriguez et al. | |
| 2003/0208307 A1 | 11/2003 | Mirabelli et al. | |
| 2003/0218562 A1* | 11/2003 | Orr | 342/20 |
| 2004/0099775 A1 | 5/2004 | Zheng et al. | |
| 2004/0239553 A1 | 12/2004 | Kim et al. | |
| 2004/0246171 A1 | 12/2004 | Orr et al. | |
| 2004/0263378 A1 | 12/2004 | Jossef et al. | |
| 2005/0184902 A1* | 8/2005 | Park et al. | 342/20 |
| 2005/0264404 A1 | 12/2005 | Franczyk et al. | |
| 2006/0132349 A1 | 6/2006 | Stern et al. | |
| 2006/0176369 A1 | 8/2006 | Meritt | |
| 2007/0046531 A1 | 3/2007 | Yu | |
| 2007/0067086 A1 | 3/2007 | Rothschild | |
| 2007/0109187 A1 | 5/2007 | Murphy | |
| 2007/0266178 A1 | 11/2007 | Wong et al. | |
| 2009/0002491 A1* | 1/2009 | Haler | 348/148 |
| 2010/0045451 A1 | 2/2010 | Periwal | |
| 2010/0317420 A1 | 12/2010 | Hoffberg | |

OTHER PUBLICATIONS

Townsel, M., Uniden Setting Industry Standard with GPS RD, Press Release, Jan. 8, Mar. 21, 2003.
Uniden, GPSRD, Owner's Manual, 2001.
Tracker TEL GPS, Enforna GPS Modem—GPS Tracking Products and Services, Webpage printed Aug. 5, 2009, Copyright 2005-2008.
Sixnet Newsletter, Industrial Cellular Modems—Sixnet, Webpage Printed Aug. 5, 2009, Copyright 2008-2009.
Reach unlimited Corporation, Trapster—Speed Trap Sharing System, Webpage printed Aug. 20, 2009, Copyright 2008.
Weblogs, Inc., Free iPhone App Prevents Speeding Tickets, Webpage printed Aug. 19, 2009, Copyright 2003-2009.
Motor Trend Magazine Blog, It's Not a Radar Detector. It's a Trapster, posted Nov. 12, 2008, printed Aug. 19, 2009.
International Patent Office, International Search Report for PCT/US2010/024915, Feb. 22, 2010.
Cobra Operating Manual, IntellilLink™ Wireless Remote Series XRS-R9G, Copyright 2007.
European Search Report, Application No. 12 163 621.1-1812, May 2, 2013.

* cited by examiner

WIRELESS CONNECTIVITY IN A RADAR DETECTOR

CROSS-REFERENCE TO RELATED APPLICATIONS

This application is a divisional of U.S. Ser. No. 12/389,978 filed Feb. 20, 2009, which will issue as U.S. Pat. No. 8,373,588 on Feb. 12, 2013. This application is related to but does not claim priority to U.S. Ser. No. 11/620,443 filed Jan. 5, 2007, U.S. Ser. No. 10/396,881, filed Mar. 25, 2004, and U.S. Pat. No. 6,670,905, each of which claim benefit of U.S. Provisional Patent Application Ser. No. 60/139,097, filed Jun. 14, 1999, and U.S. Provisional Patent Application Ser. No. 60/145,394, filed Jul. 23, 1999. All of these related applications are hereby incorporated herein in their entirety.

FIELD OF THE INVENTION

The present invention relates to radar detectors.

BACKGROUND OF THE INVENTION

Radar detectors warn drivers of the use of police radar, and the potential for traffic law citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. By the early 1990's, police radar evolved to the point that it could operate almost anywhere in the 1600-megahertz wide Ka band. During that time radar detectors kept pace with models that included descriptive names like "Ultra Wide" and "Super Wide." More recently, police have begun to use laser (optical) systems for detecting speed. This technology was termed LIDAR for "LIght Detection And Ranging."

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a digital signal processor have been shown to provide superior performance over solutions based on conventional microprocessors due to the DSP's ability to find and distinguish signals that are buried in noise. Various methods of applying DSP's were disclosed in U.S. Pat. Nos. 4,954,828, 5,079,553, 5,049,885, and 5,134,406, each of which is hereby incorporated by reference herein.

Police use of laser has also been countered with laser detectors, such as described in U.S. Pat. Nos. 5,206,500, 5,347,120 and 5,365,055, each of which is incorporated herein by reference. Products are now available that combined laser detection into a single product with a microwave receiver, to provide comprehensive protection.

The DSP or microprocessor in a modern radar detector is programmable. Accordingly, it can be instructed to manage all of the user interface features such as input switches, lights, sounds, as well as generate control and timing signals for the microwave receiver and/or laser detector. Early in the evolution of the radar detector, consumers sought products that offered a better way to manage the audible volume and duration of warning signals. Good examples of these solutions are found in U.S. Pat. Nos. 4,631,542, 5,164,729, 5,250,951, and 5,300,932, each of which is hereby incorporated by reference, which provide methods for conditioning the response generated by the radar detector.

Methods for conditioning detector response are gaining importance, because there are an increasing number of signals present in the X, K, and Ka bands from products that are completely unrelated to police radar. These products share the same regions of the spectrum and are also licensed by the FCC. The growing number of such signals is rapidly undermining the credibility of radar detector performance. Radar detectors cannot tell the difference between emissions from many of these devices and true police radar systems. As a result, radar detectors are increasingly generating false alarms, effectively "crying wolf", reducing the significance of warnings from radar detectors. Among the possible sources of false alarms are microwave door openers, public safety systems such as ARTEMIS, and other radar detectors. At this time, there are very few signal sources that can cause false laser detections in comparison to the substantial list of false microwave signals just described. However certain locations near airports have been demonstrated to cause such problems for various laser detector products. The issue of false signals and ways of addressing geographically fixed false sources, is addressed in the above-referenced U.S. Pat. No. 6,670,905, in which the characteristics of false sources are stored with reference to the GPS-based location of the source, so that in subsequent encounters the false source may be ignored or the response to that source conditioned.

Vehicle electronics continue to increase in sophistication; GPS receivers and satellite receivers are now commonplace. Furthermore, wireless (typically Bluetooth) connectivity to cellular telephones and cellular networks has become commonplace, permitting hands free operation and in some circumstances, Internet or text messaging (SMS) connectivity within the vehicle electronic systems. As these vehicle electronic systems continue to propagate and increase in complexity, increasingly sophisticated functionality will be available to drivers from their vehicle electronics.

SUMMARY OF THE INVENTION

In one aspect, the invention features a police activity detector that includes an external memory interface coupled to the detector processor, allowing the processor to connect to external memory via the interface to retrieve or store said software and/or data or copies thereof.

In specific embodiments, the external memory interface is a secure digital (SD/uSD) card interface, or a universal serial bus (USB) interface. The data in the external memory can include stored voice commands, voice files, text files in a selected language, radar source locations and characterizations, geographic locations of police enforcement activity, speed camera locations, and red light camera locations. The external interface may be in a separate housing from the detector per se, such as in a windshield mounting.

The detector may also include a safety warning system (SWS) radio receiver acquiring SWS data, and alerting a driver of SWS data acquired by the receiver.

The detector may also include a wireless networking radio for communication with networked devices using a digital networking communication standard in the IEEE 802.X family.

In a second aspect, the invention features a radar detector having a wireless device interface comprising a radio compliant with one or more of: Bluetooth, Zigbee, 802.11, and wireless personal area network communication protocols, so that the detector's processor interacting wirelessly with an external device via said wireless device interface.

In specific embodiments, the detector may pair with a Bluetooth headset, so as to deliver warnings to a user of the detector via the headset. Alternatively, the detector may pair with a Bluetooth-compatible cellular network device, allowing the detector's processor to use the cellular device to obtain an Internet connection, and exchange data with a remote server via the Internet connection, or establish a telephone connection, and exchange data with a remote server via said telephone connection by use of dual tone multiple frequency (DTMF) signaling.

In other specific embodiments, the external device may be a global positioning receiver, allowing the processor to use location data to determine whether to issue a warning to a user of the detector.

In disclosed embodiments, the external device may be enclosed in a housing that incorporates a cigarette lighter plug for obtaining 12 volt power from a cigarette lighter connector.

In a further aspect, the invention features a warning system having a global positioning system and a wireless device interface comprising a radio compliant with one or more of: Bluetooth, Zigbee, 802.11, and wireless personal area network communication protocols, allowing a processor of the warning system to interact wirelessly with an external device via said wireless device interface to obtain or store data related to positions and data relative to police activity at those positions.

In the specific disclosed embodiment, the warning system may have the form of a toggle button which may be activated by a user to indicate the presence of police activity at a current position, and which may include a speaker for generating warnings upon approach to a speed trap or other police activity area.

In other embodiments, the external device may be a Bluetooth-compatible wireless cellular device, such that the processor connects to the wireless cellular device to obtain an Internet connection, and exchanges data with a remote server via said Internet connection, or connects to the wireless cellular device to establish a telephone connection, and exchanges data with a remote server via said telephone connection by use of dual tone multiple frequency (DTMF) signaling.

In yet another aspect, the invention features a radar detector upgrade device, for use with the power/data connector on a radar detector. The device has a housing that incorporates a cigarette lighter plug for obtaining 12 volt power from a cigarette lighter connector, and a position indicating circuit for detecting a current position and storage for storing information regarding particular positions. The upgrade device couples power obtained from the cigarette lighter connector to the radar detector, and receives indications of alerts from the connected radar detector. The upgrade device also references the current position and stored data to determine whether to mute the alert in the event the current location correlates to a location at which an alert is to be muted.

The upgrade device may also learn locations of police activity or false alarms thereof by storing a current location as identified by said position indicating circuit when an alert is indicated by the radar detector.

The above and other objects and advantages of the present invention shall be made apparent from the accompanying drawings and the description thereof

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 8B1 and 8B2 illustrate alternate embodiments in which a navigation unit communicates via wired or wireless connections to a radar detector.

FIG. 8C1 and 8C2 illustrate alternate embodiments in which a GPS unit communicates via wired or wireless connections to a radar detector.

DETAILED DESCRIPTION OF SPECIFIC EMBODIMENTS

Figure 1:
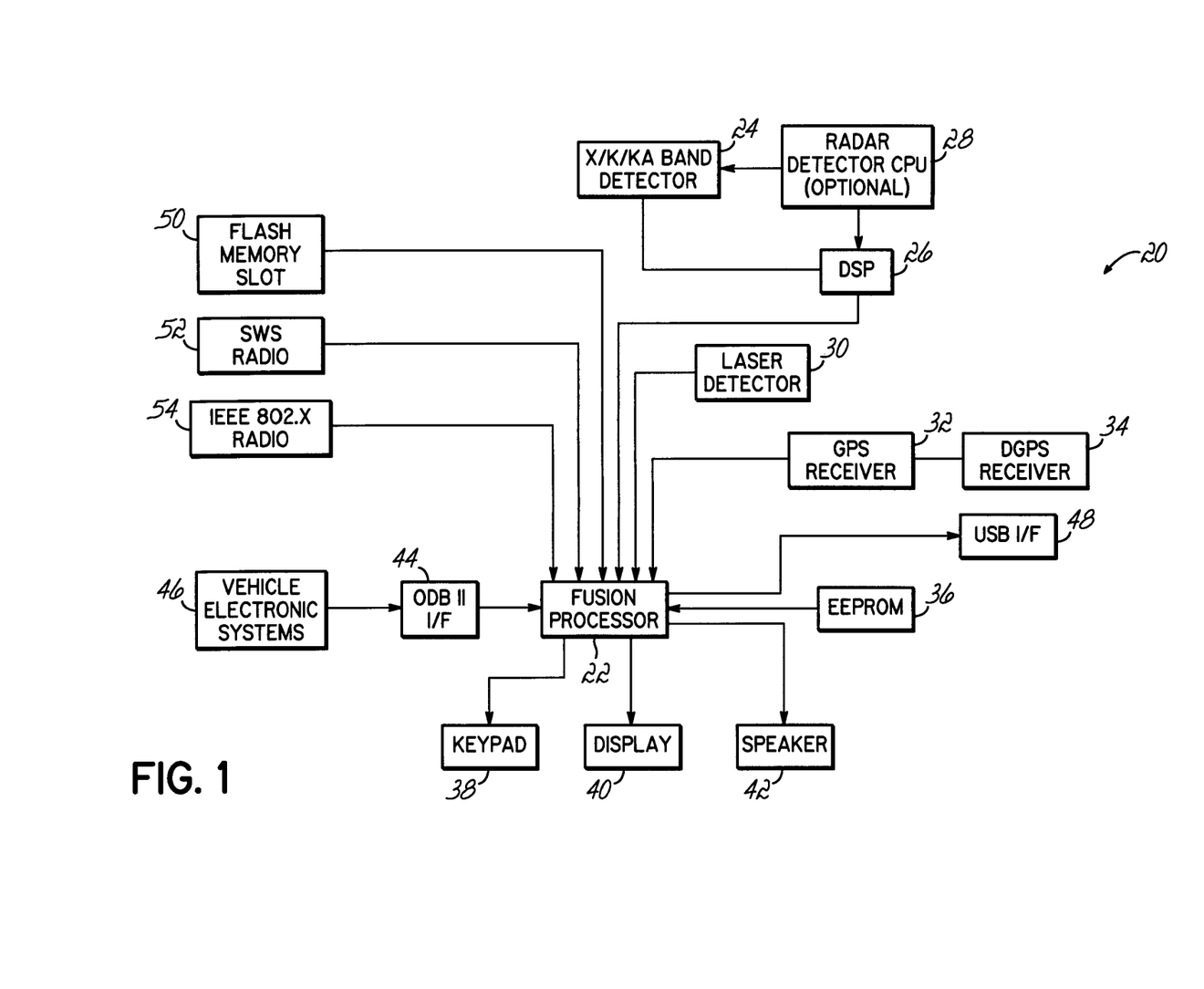
FIG. 1 is an electrical block diagram of a radar detection circuit in accordance with principles of the present invention.

Referring now to FIG. 1, the radar detector 20 in accordance with principles of the present invention includes a processor 22 for controlling all functions of the unit. Processor 22 receives information on radar signals from a conventional X/K/KA band microwave receiver 24, coupled to processor 22 via a digital signal processor (DSP) 26. Microwave receiver 24 and DSP 26 may utilize any of the techniques described above and in the above-referenced patents, for rejecting noise and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 30 for detecting police LIDAR signals. Processor 22 is further connected to a GPS receiver 32 and a separate differential GPS (DGPS) receiver 34, such that differential GPS methodologies may be used where beacon signals are available. Since the radar detector application described in this patent is not a candidate for military class service, it is not able to access the more accurate PPS. However it is considered a "civil user" and can use the SPS without restriction.

Processor 22 executes a stored program, found in an electrically erasable programmable read only memory (EEPROM) 36, flash memory, or masked read only memory (ROM). The processor is programmed to manage and report detected signals in various ways depending on its stored program. This programming includes functions for detector response conditioning, as elaborated below.

The radar detector further incorporates a user input keypad or switches 38. Operational commands are conveyed by the user to processor 22 via the keypad. Processor 22 is further connected to a display 40, which may comprise one or more light emitting diodes for indicating various status conditions, or in a more feature-rich device, may include an alphanumeric or graphical display for providing detailed information to a user. A speaker 42 is also provided to enable processor 22 to deliver audible feedback to a user under various alert conditions, as is elaborated below.

Processor 22 may further include an interface 44, such as an ODB II compliant interface, for connection to vehicle electronic systems 46 that are built into the vehicle. Modern vehicles are being equipped with standardized information systems using the so-called OBD II standard interface. This standard interface is described in an article entitled ODB II Diagnostics, by Larry Carley, from Import Car, January 1997, which is hereby incorporated herein by reference. Processor 22, using the OBD II standard interface 44, can obtain vehicle speed and other vehicle status information directly from the vehicle, and then may use this information appropriately as described in more detail below. Additional and more detailed information and functionality may be obtained by Intelligent Vehicle Data Bus (IVDB) systems that may in the future be incorporated into vehicles in addition to or in place of OBD II.

Processor 22 is further coupled to a Universal Serial Bus (USB) interface 48 (which may be of the series "mini-B" variety) that provides a means for uploading and downloading information to and from processor 22. It should be noted that there are three types of USB connection, Series "A", "B", and "mini-B". The series "mini-B" receptacle has the dimensions 6.9 mm by 3.1 mm, whereas series "A" has the dimensions 12.5 mm by 5.12 mm. The standard USB is of the series "A" variety. In one embodiment the present invention contemplates the use of the series "mini-B" receptacle. The "mini-B" would utilize less space on the detector than the standard series "A" USB. USB interface 48 may be used to automate the assimilation of coordinate information into data structures in EEPROM 34, as described below.

Processor 22 may serve as a host on USB interface 48, or may serve as a slave on that same interface. In the former case, USB interface 48 may also be used to interface the detector to a USB storage device such as a flash memory. In the latter case, the USB interface 48 may permit the processor to communicate with a separate host computer or product application for the purposes of updating or monitoring the activity of the detector.

External storage devices coupled via USB interface 48 may have a larger storage capacity than available from internal memory. Remote storage devices may include any form of dynamically allocatable storage device (DASD) such as a flash memory, hard disk drive, removable or fixed magnetic, optical or magneto-optical disk drive, or removable or fixed memory card, or any device including a dynamic directory structure or table of contents included in the storage format to permit dynamic storage allocation. The storage device, or host computer or other connected device need not be visible to the driver and may be in any convenient location, such as under the vehicle dash.

USB interface 48 may also be used for the purposes of firmware upgrade. From time to time updates and bug fixes may become available, e.g. through a manufacturer website. USB interface 48 will enable the user to apply the appropriate firmware upgrade or bug fix, whereas in a prior embodiment the manufacturer would have conducted such an upgrade.

USB interface 48 could also be used to add other user waypoints. The Internet provides a convenient means for storing and accessing repositories of information. Web sites may be established and devoted to this task, and provide several convenient types of training information. One could be a training file containing the coordinate information from the online "Speed Trap Registry" at the Internet site www.speedtrap.com. This information would be usable to set "always warn" bits at the locales of known speed traps. A second type of training information would be training files submitted by individuals for use in particular areas, and the third type of information would be aggregate training files created by integrating individually-submitted information into single files organized by region. Aggregate training files would be managed and updated by the web site administrator.

Where a host computer is used in conjunction with the radar detector 20, coordinate information can be stored, e.g., on a hard drive organized with an indexed database structure to facilitate rapid retrieval, and the hard drive may include a special purpose processor to facilitate rapid retrieval of this information. Where a general purpose host computer is connected via the USB interface, it will likely be based on a higher scale CPU chip and thus be able to efficiently carry out complex coordinate comparison tasks such as are described below, and such tasks may be delegated to the host CPU rather than carried out in processor 22. The host CPU can also anticipate the need for information about particular coordinates based upon vehicle movements, and respond by retrieving records within proximity of the current location for ready delivery to fusion processor 22. The host computer can also provide navigational functions to the driver, potentially using stored signal information and flag bits to provide the user with location-specific information about driving hazards and potential police stakeout locations.

As an alternative to a USB interface, radar detector 20 may include wired or wireless functionality for exchange of data. For example, in a wired embodiment, a flash memory slot 50 such as a secure digital (SD) or micro secure digital (uSD) slot could be used to provide data to and obtain data from the radar detector 20. Flash memory may provide a larger memory space available for databases, as an augmentation to the EEPROM memory 36.

Flash memory is non-volatile computer memory that can be electrically erased and reprogrammed. The non-volatile designation means that no power is needed to maintain the information stored on the card. In addition, flash memory offers fast read access times and better kinetic shock resistance than a hard disk. Another feature of flash memory is that when packaged in a memory card (or a USB device), it is enormously durable, being able to withstand intense pressure, extremes of temperature, and even immersion in water. These features make a flash memory card an ideal candidate for the harsh environment inside a vehicle. Some flash memory card formats include Secure Digital (SD), micro Secure Digital (uSD), Secure Digital High Capacity (SDHC), and Secure Digital Input Output (SIDO).

It will be appreciated, as noted above, that flash memory functions described above may be achieved by a USB connectable flash memory device. In this implementation the radar detector 20 USB connector 48 hosts a mass storage device rather than or in addition to being usable as a USB slave device.

Processor 22 is further coupled to a Safety Warning System (SWS) radio 52 capable of signals from Dedicated Short Range Communication (DSRC) beacons transmitting on the 5.9 GHz frequency band and designated for vehicle use. The SWS/DSRC is an infrastructure capable of transmitting warning information to surrounding vehicles in the vicinity of travel of various, possibly hazardous, situations. Some transmitted warnings include freezing bridge warnings, fog zone warnings, rest area alerts, rail road crossing warnings, and construction zone alerts. In accordance with principles of the present invention, SWS information may be received and alerted to a driver through numerous possible user interfaces as disclosed herein.

Processor 22 further incorporates an IEEE 802.X radio 54 that provides a means for sending data packets across local area networks or metropolitan area networks. Specifically, the IEEE 802.X interface 54 may be used to transmit data packets via the 802.11 family, also known as wireless local area network computer communication (Wi-Fi), developed by the IEEE LAN/MAN Standards Committee in the 5 Ghz and 2.4 Ghz public spectrum bands. The IEEE 802.X interface 54 may also be used to transmit data packets via the 802.15 family, also known as wireless personal area network (WPAN) communication. This specific family can be further divided into two subgroups designated 802.15.1, known as Bluetooth, and 802.15.4, known as Zigbee.

Bluetooth is a wireless protocol utilizing short-range communications technology facilitating both voice and data transmissions over short distances from fixed and/or mobile devices, creating the aforementioned WPANs. The intent behind the development of Bluetooth was the creation of a single digital wireless protocol, capable of connecting multiple devices and overcoming issues arising from synchronization of these devices. Bluetooth provides a way to connect and exchange information between devices such as GPS receivers, radar detectors, personal headsets, and mobile phones over a secure, globally unlicensed 2.4 GHz short-range radio frequency bandwidth.

Zigbee is a wireless protocol utilizing low-rate WPANs, and focuses on low-cost, low-speed ubiquitous communication between devices. The emphasis is on very low cost communication of nearby devices with little to no underlying infrastructure, intending to lower power consumption. The touted feature of Zigbee is the ability to achieve extremely low operational costs, due to reduced power consumption, and its technological simplicity.

Although Bluetooth and Zigbee are not expressly intended for this use, in accordance with principles of the present invention, the radar detector 802.x radio could pair with a cellular telephone using a headset or other handsfree device profile, to enable the radar detector to dial telephone numbers and exchange DTMF signals, or alternatively to use text messaging/SMS to communicate information to and from a remote server and/or database.

Bluetooth or other 802.x technology may also be used to connect a conventional headset profile to the radar detector 802.x radio, so as to provide remote audio alerting to the conventional headset. This implementation may find particular utility in motorcycles or convertibles where a speaker integrated into the radar detector may be difficult to hear.

As an example, signal information may also be downloaded from various hosts, for example, a connection may be established directly via the USB interface or a wireless interface to an Internet site carrying signal information, as is now done in a text form at the Internet site www.speedtrap.com. An indirect Internet connection may also be established via a cellular telephone, WiFi hot spot, or host computer. Connections may be used to obtain speed trap information, as discussed above, or to obtain other speed monitoring information such as speed camera locations. Furthermore, a connection may be used to check for available firmware updates or other system changes that need to be announced to all enabled devices. Furthermore, peer-to-peer connections may be established between two receivers, e.g. a trained receiver having extensive signal information, and a receiver having less extensive information, to transfer signal information between the receivers so that either or both has a more complete set of signal information. Speed camera locations and firmware may also be transferred in this peer-to-peer mode. Finally, it will be appreciated that peer-to-peer connections may be made directly over an 802.x ad-hoc network, or may be made through a LAN or Internet infrastructure utilizing a peer locating server as is now commonly used in file sharing and gaming networks.

In one embodiment, a database of locations is incorporated within the radar detector 20, and processor 22 is a multi-threading processor, such that the multithreading processor 22 manages the location database without involvement of external processors or hosts. The multithreading processor 22 may be programmed to allow rapid continuous processing of records in the location database using parallel threads. Generally speaking, processor 22 compares the radar detector's immediate coordinates with a stored list of the coordinates of unwanted stationary sources. If the radar detector receives a microwave/laser signal within a certain distance of one of these pre-designated sources, processor 22 applies additional constraints to the detection criterion before alerting the user. Since stationary radar sources make up the bulk of the unwanted sources, there is a significant benefit resulting from these functions.

It will be appreciated that processor 22 may execute a program on EEPROM 36 or may execute a stored program found in flash memory in slot 50, in addition to or instead of the programming found in EEPROM 36. Furthermore, firmware upgrades from flash memory may include, for example, voice files used by the radar detector to provide voiced alerts as is now a common feature. This functionality provides a ready upgrade path to language extension of the device to different markets, and allows updating and upgrading of functions to include voiced feedback as well as on-screen displays. Furthermore, it will be appreciated that the flash memory slot may be incorporated into a device in wireless communication with the processor 22 via, for example, the 802.x radio 54, so that flash memory in a connected cellular telephone, power source attachment, vehicle navigation system, or dashboard GPS receiver or radar detector display, may conveniently include a flash memory card reader slot that is accessible to processor 22.

Figure 3:
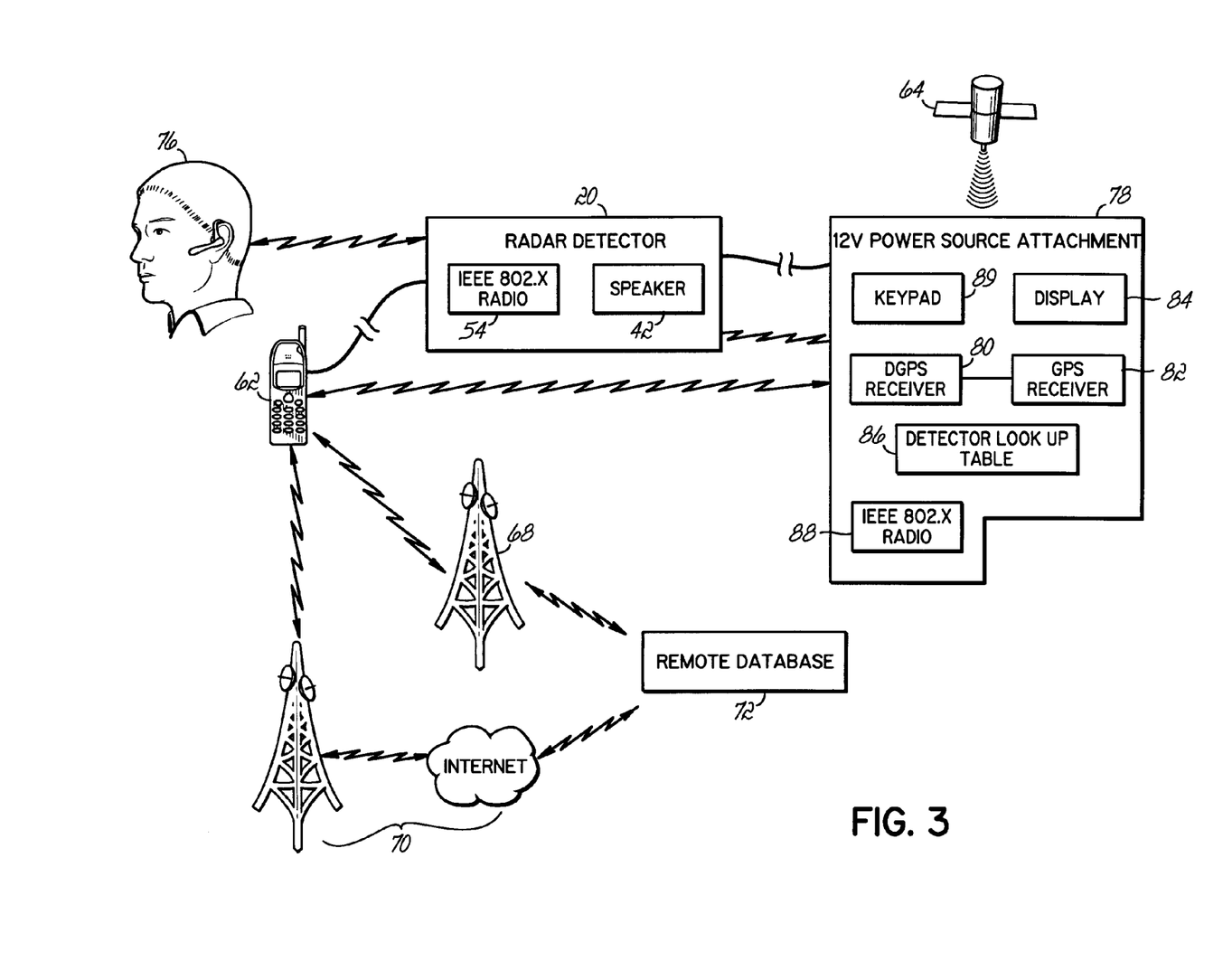
FIG. 3 is a block diagram of an embodiment of the present invention in which radar detector functionality is incorporated into a 12 volt power source attachment.

FIG. 3 illustrates a block diagram of the present invention in operation in a particular vehicle environment. The embodiment includes a radar detector 20, power supply 60, mobile telephone 62, location sensing satellite 64, SWS communication network 66, telephone communication network 68, Internet communication network 70, and a remote database 72. In this embodiment the detector 20 obtains operational power through a power supply 60 connected by an operable means, such as the SmartPlug which is used by the assignee of the present invention. However, operational power may be provided through on board means, such as a rechargeable battery. Operational power is described as the power required to allow the detector to execute all described functions.

In the embodiment of FIG. 3, the detector 20 has an operable connection with a mobile telephone 62. In this embodiment the mobile telephone 62 is enabled with IEEE 802.15.1 technology, also known as Bluetooth. While the operable connection between the detector 20 and the mobile telephone 62 may be in the form of a serial or USB cord, many cellular telephones presently available permit communication through the IEEE 802.X radio 54 of the detector 20. The detector 20 also incorporates a Safety Warning System radio 52 that allows the detector 20 to receive informative messages regarding upcoming or ongoing road conditions.

During a radar detection alert in this embodiment, the detector 20 is able to obtain the GPS coordinates of the detection, accomplished by communications between satellites 64, beacons (not shown), the DGPS receiver 34 and GPS receiver 32 of the detector 20. With the coordinates obtained by the receivers 32, 34, the detector 20 is able to determine whether the detected signal can be correlated with a signal detected in a previous radar detection encounter. To correlate the present signal detection with a previous detection encounter, the detector 20 compares various parameters of the current detection with the stored parameters of the previous detection. Parameters that may be evaluated are the signal signature of the present detected signal versus the signal signature of a previously detected signal within a predetermined area of the received coordinates, the detector's rate of travel at the time of the present detection versus the rate of travel at the time of a previous detection within a predetermined area of the received coordinates, the direction of travel at the time of the present detection versus the direction of travel at the time of a previous detection within a predetermined area of the received coordinates. These parameters are stored on a detection look up table 74 located on the EEPROM 36 of the detector 20.

Once a detection has been matched with a previous detection the detector 20, evaluates past user input during the previous detection when deciding whether and how to alert driver of the present detection. If the user has designated the matched detection as a false alert, then the detector 20 may mute the speaker 42 and/or forego a visual alert. Alternatively, if the user has designated the matched detection as an authentic detection, then the detector 20 may alert through the speaker 42 and/or create a visual alert. Additionally, the detector may send an audible alert to a Bluetooth headset 76 through the IEEE 802.X radio 54. This feature is especially useful in environments where the user may have difficulty hearing an alert tone from the detector's speaker 42 or would prefer a more personal in ear alert.

The operable connection with the mobile telephone 62 allows the detector 20 to communicate with a remote database 72. The remote database 72 stores transmitted GPS coordinates of an observed radar encounter or a detected radar encounter. An observed radar encounter is a situation when the user notices a speed trap, traffic camera, or other mechanism designed for purposes of ticket revenue or traffic deterrence instead of safety that may or may not be emitting radar. A speed trap may be defined as a location where the police strictly enforce the speed limit. Alternatively, a speed trap may be defined as a road section where police are known to have a reputation for writing an unusually high number of traffic tickets, the posted speed limits are not easily seen, or the speed limits are set much lower than a road engineering survey may suggest.

The communication with the remote database 72 of the present invention involves the user operatively indicating to the detector 20 that the present detection (observed or detected) is a speed trap. This may be done with a switch, remote button, or by a button located on the detector 20. Once a user operatively characterizes a detection as a speed trap, the detector 20 communicates with the mobile telephone 62, which communicates particular parameters to the remote database 72. The communication between the mobile telephone 62 and the remote database 72 may be accomplished through a telephone communication network 68 such as a GSM or CDMA2000 protocol. Communication through a telephone communication network 68 may be in the form of a short message through the short message service (SMS). The communication through the telephone communication network 68 may also be in the form of dual tone multi-frequency (DTMF), also known as touchtone. Where the mobile telephone 62 is capable of Internet connectivity, the communication between the mobile telephone 62 and the remote database 72 may be accomplished through an Internet communication 70. The mobile telephone 62 may obtain Internet connectivity to the remote database 72 through Internet communication 70 protocols such as WiFi, Zigbee, EDGE, or 3G.

The detector 20 may also receive notifications from the remote database 72. These notifications may communicate the location of speed traps that other detector users have observed and reported. By broadcasting the GPS coordinates through Internet communication means 70 or telephone communication means 68 in operable communication with the mobile telephone 62 that is in operable communication with the detector 20, the remote database 72 is able to send information to the detector 20. This information include the GPS coordinates of speed traps indicated by other detector users. This feature can provide real time speed trap notification to detector users and alert them to proceed with caution when a speed trap is approached.

The present invention also contemplates the use of non-GPS enabled detectors. FIG. 3 illustrates a block diagram of an embodiment of the present invention where the detector is an non-GPS enabled detector 20. In this embodiment the power source attachment 78 houses a DGPS receiver 80, a GPS receiver 82, a status display 84, and a detection look up table 86. In this embodiment the detector 20 may obtain operational power through the power source attachment 78, and operatively communicate with the power source attachment 78 regarding previous and present detections through a USB or serial cord connection or through IEEE 802.X radio 88.

Optionally, radar detector 20 may itself include an 802.x radio permitting wireless communication with power source attachment 78, in which case radar detector 20 may be battery powered, or may be remotely located such as in the vehicle's grille area, requiring only a 12 volt power connection for complete installation.

Figure 2:
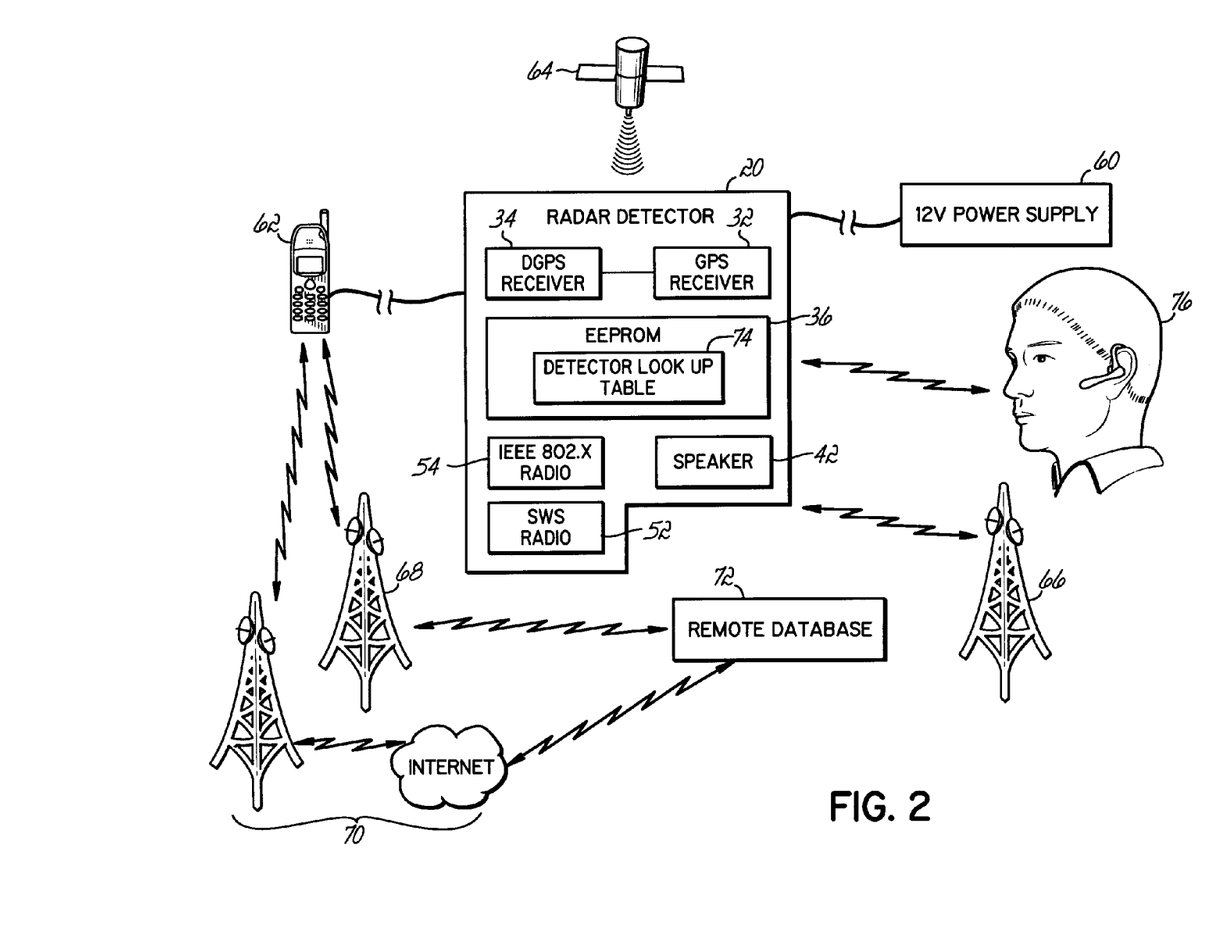
FIG. 2 is a functional block diagram of the radar detector of FIG. 1 placed within its operating environment to demonstrate possible uses.

As is done by circuits within the detector of FIG. 2, the power source attachment 78 correlates stored data parameters of a present detection to the parameters of a previous detection and mutes the speaker 42 of the detector 20 and/or the visual alert accordingly. The power source attachment 78 is also equipped with a means of designating speed trap locations. This may take the form of a button or switch located on a keypad 89 of the power source attachment 78. In this embodiment, the power source attachment 78 is in operable communication with the mobile telephone 62, and with this configuration the user is still able to designate speed traps and communicate with the remote database 72 with similar communication means described above. The power source attachment 78 may also receive updated information regarding speed trap locations from the remote database 72 with similar communication means described above. Also as noted above, the power source attachment 78, or the detector 20 itself, can transmit warnings to a Bluetooth headset 76 through the IEEE 802.X radio 54.

Figure 4:
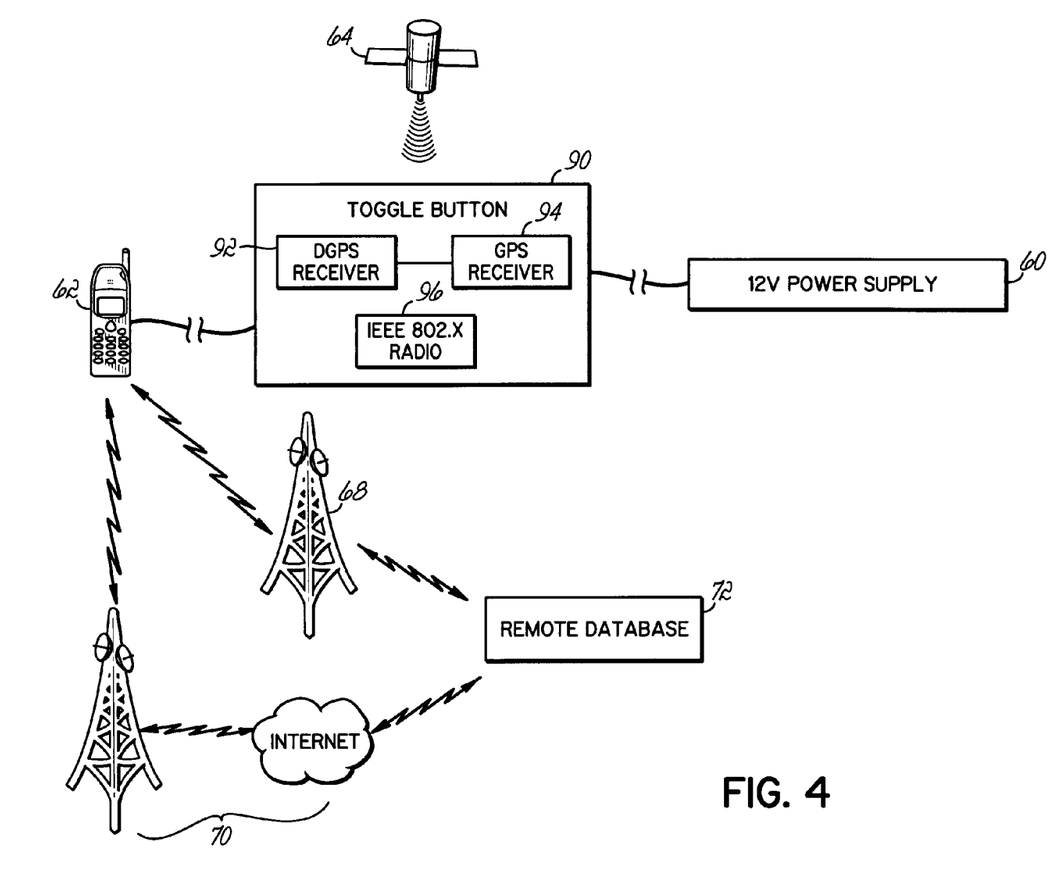
FIG. 4 is a block diagram of an embodiment of the present invention where a toggle button is in operable communication with a mobile communication device for speed trap detection.

FIG. 4 illustrates a block diagram of an embodiment of the present invention where there is no radar detector present. In this embodiment a button assembly 90 houses a DGPS receiver 92, GPS receiver 94, and an IEEE 802.X radio 96. The button assembly 90 is in operative communication with a power supply 60, and a mobile telephone 62. The communication between the button assembly 90 and the mobile telephone 62 may be made either by a serial or USB connection or through the IEEE 802.X radio 62.

In the embodiment of FIG. 4, the toggle button assembly 90 includes a GPS receiver 94 and DGPS receiver 92 for detecting a current location, and interacts via an IEEE 802.x radio with a cellular telephone 62 or other communication device to retrieve speed trap locations from a remote database 72. This communication may be by the telephone communication network 68, or the Internet communication network 70 by the means described above. Nearby speed traps which have been identified in the database are acquired and if the vehicle approaches one of those speed traps, a warning is delivered via the cellular telephone 62 or via a display and/or speaker which may be included in the toggle button assembly 90.

Furthermore, when a user of the embodiment of FIG. 4 visually detects a speed trap, the user may activate the button assembly 90, by toggling a button, switch, or knob. Once activated the button assembly will document the GPS coordinates received by the DGPS and GPS receivers 92, 94 that communicate with the location sensing satellite 64, and then operatively communicate the information to the mobile telephone 62. The mobile telephone 62 may then transmit the coordinates of the detection to the remote database 72. Subsequently, other travelers may receive Internet messaging, or retrieve an update from database 72, including the annotation of the speed trap, and deliver the appropriate warnings.

Figure 5:
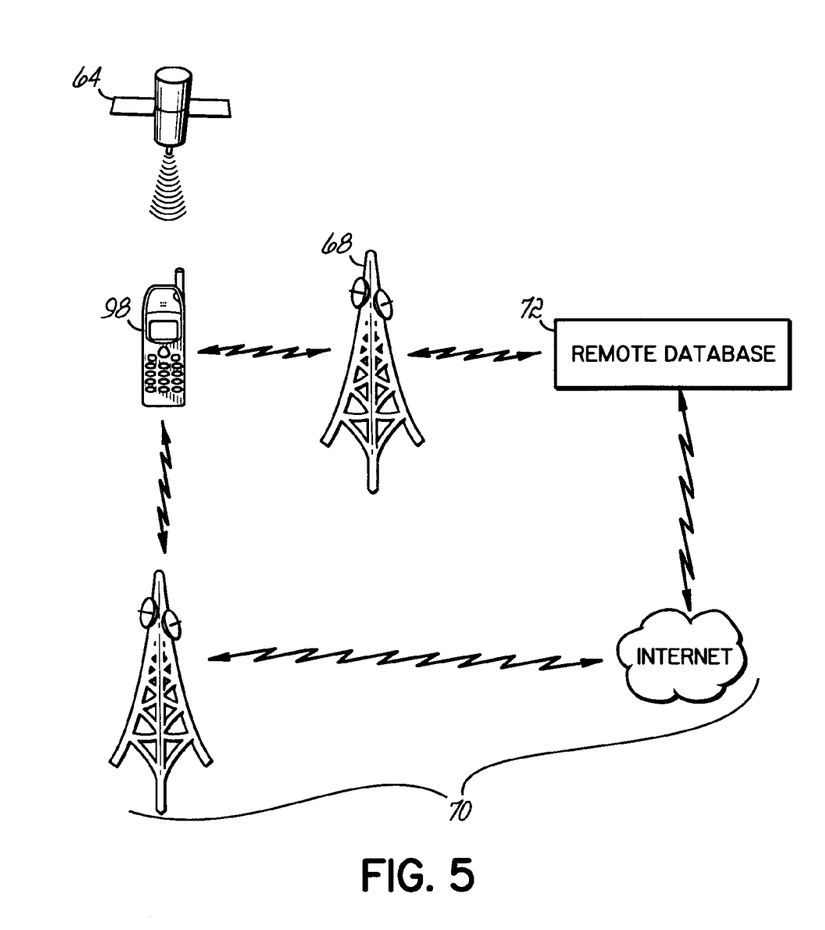
FIG. 5 is a block diagram of a speed trap detection system that uses only mobile communication devices.

FIG. 5 illustrates, for comparison, a block diagram of an embodiment of a speed trap detection system that utilizes a mobile phone. Recently a system of this kind has been marked at the URL www.trapster.com. In this application, a user reports the detection of a speed trap through an application on a GPS enabled mobile telephone 98 by pressing a programmed button on the phone 98. Button activation will cause the phone 98 to document the GPS coordinates received from a locating satellite 64, and send the received coordinates of the indicated speed trap to the remote database 72 by a telephone communication network 68, or via an Internet communication network 70. Subsequently, the application on the GPS enabled mobile telephone may retrieve locations of speed traps stored in remote database 72 and deliver responsive alerts to the user of the phone. This embodiment requires the use of a GPS enabled mobile telephone, a customized application on that telephone, and the constant operation of that application on the telephone, none of which are required in the embodiment of FIG. 4, making FIG. 4 more usable for many environments which are not available in FIG. 5.

Figure 6:
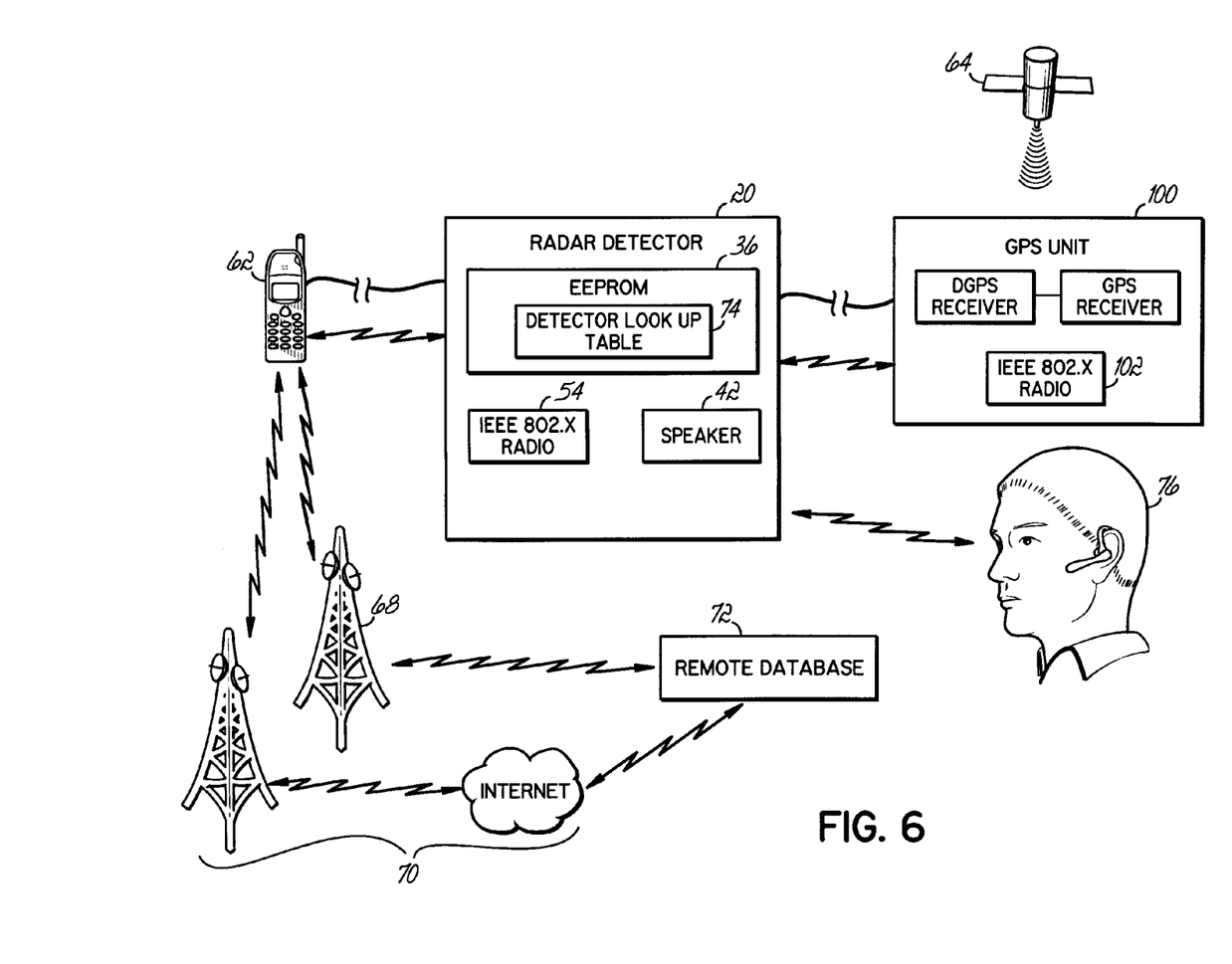
FIG. 6 is a block diagram of an embodiment of the present invention where a radar detector is in operable communication with a GPS unit.

FIG. 6 illustrates a block diagram of an embodiment of the present invention where the detector 20 is in operable communication with a GPS unit 100. In this embodiment the detector 20 and GPS unit 100 may communicate through a serial or USB connection, or through IEEE 802.X radios 54, 102. When the detector 20 detects radar, it will access the coordinates provided by the GPS unit 100 that is in operable communication with a location sensing satellite 64, and determine whether the detected signal can be correlated with a signal detected in a previous radar detection encounter. Accessing the detector look up table 74 located on the EEPROM 36 and correlating of the present signal with a previous detection encounter as described above. Additionally, whether and how the detector 20 alerts through the speaker 42 is described above. The detector 20 in this embodiment is in operative communication with a mobile telephone 62 either by a serial or USB connection or through the IEEE 802.X radio 54. Through this connection the invention is able to operatively communicate with the remote database 72 by a telephone communication network 68 or an Internet communication network 70 through the method described above. The detector 20 in this embodiment is also able to receive speed trap location updates from the remote database 72. The detector 20 may send an audible alert to a Bluetooth headset 76 through the IEEE 802.X radio 54.

Figure 7:
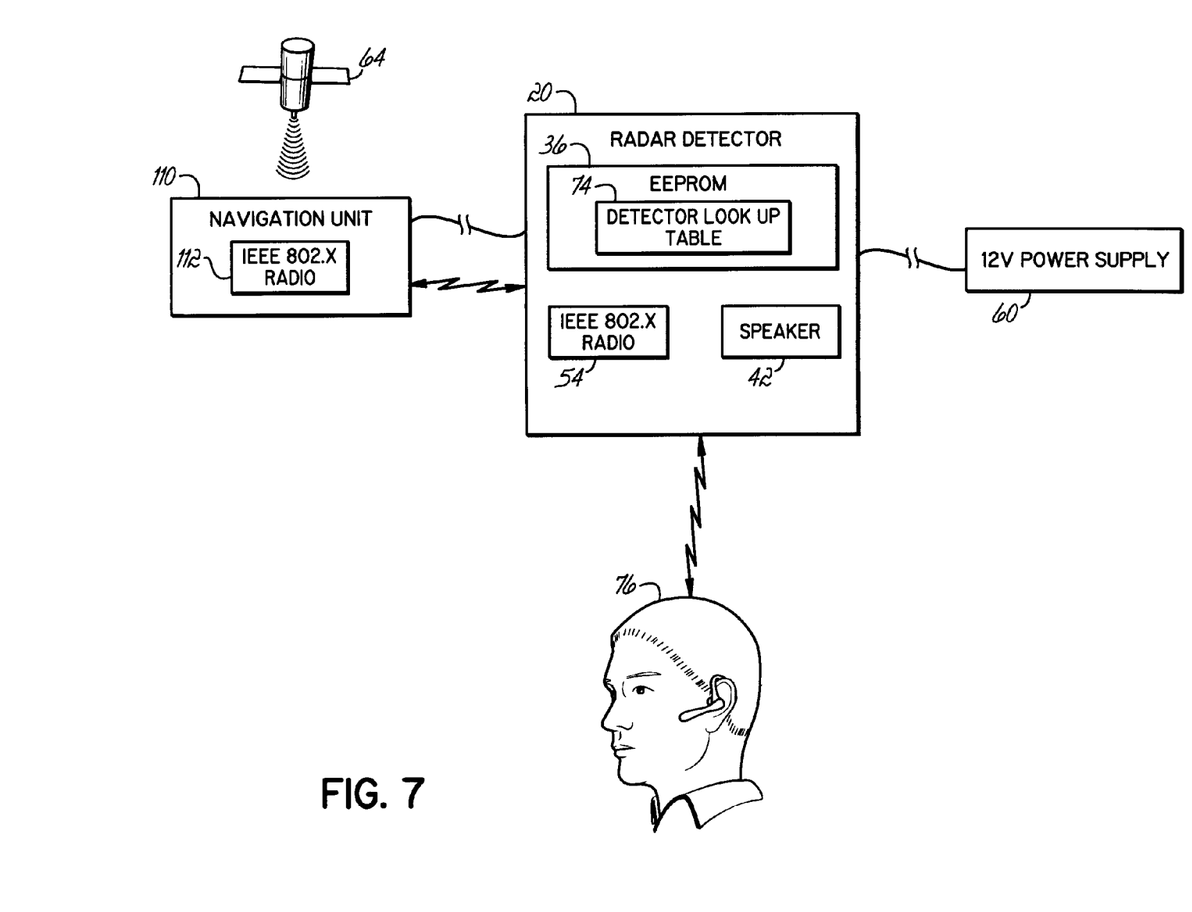
FIG. 7 is a block diagram of an embodiment of the present invention where a detector is in operable communication with a navigation unit.

FIG. 7 illustrates a block diagram of an embodiment of the present invention where the detector 20 is in operable communication with a power supply 60 and a navigation unit 110. In this embodiment the detector 20 is in operative communication with a navigational unit 110 through a serial or USB connection, or through IEEE 802.X radios 54, 112. When the detector 20 detects radar, it will access the coordinates provided by the navigational unit 110 that is in operable communication with satellites 64 and determine whether the detected signal can be correlated with a signal detected in a previous radar detection encounter. The detector 20 then accesses the detector look up table 74 located on the EEPROM 36 and correlating of the present signal with any previous detection encounter as described above, and determines whether and how to alert through the speaker 42 as described above. The detector 20 may send an audible alert to a Bluetooth headset 76 through the IEEE 802.X radio 54.

Figure 8A:
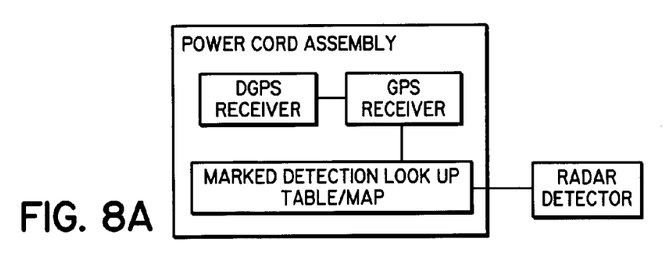
FIG. 8A is an illustration of a radar detector coupled to an aftermarket power cord assembly incorporating GPS functionality.

Referring now to FIG. 8A, in an alternative embodiment the invention may be implemented as a substitute power cord assembly for a radar detector. In this embodiment the power cord assembly includes a GPS receiver, DGPS receiver and marked detection lookup table or map. The power cord assembly is coupled to a conventional radar detector to provide power to the detector and to provide a mute signal to the detector. It will be appreciated that the power cord used with many conventional radar detectors includes a signal line for a mute signal, which is activated by a pushbutton on the power cord assembly. The power cord assembly of FIG. 8A connects to this mute signal line and provides a mute signal to the detector in the event that the location of the detector, as determined by the GPS receiver in the power cord assembly, correlates to a rejectible signal as identified in the lookup table in the power cord assembly. The database in the power cord assembly may be updated in the event that the user mutes an alert of a radar signal being generated by the radar detector, e.g., the power cord assembly may provide the user the option to store the location where the mute was engaged, to prevent future alerts at the same or a similar location.

The embodiment of FIG. 8A may be further implemented through a firmware upgrade to a conventional radar detector. New firmware in the detector may cause the detector to differently condition its alerts upon responses from the power connector, so that the GPS receiver in the power cord is more tightly coupled to the radar detector and more tightly controls the alerts from the GPS receiver in a manner more directly akin to an integrated unit.

Figure 8B:
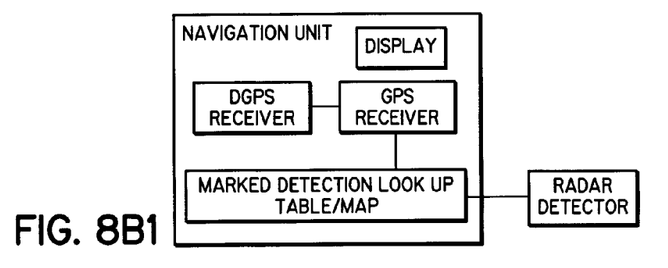
Figure 8B:
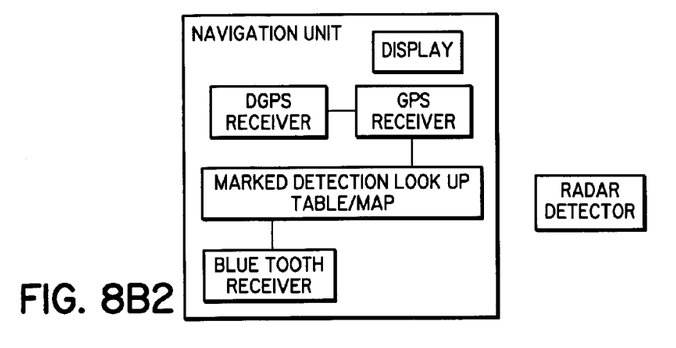
Figure 8C:
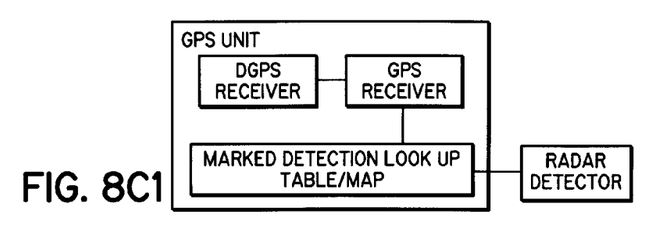
Figure 8C:
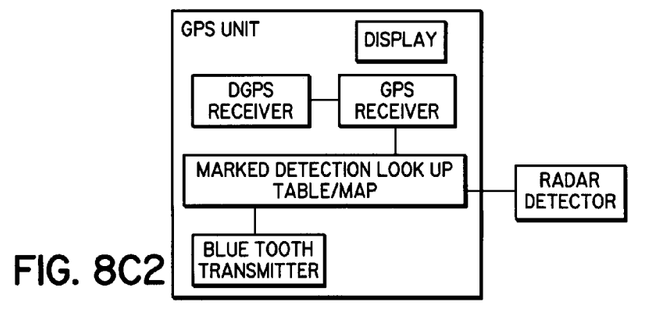

FIGS. 8B1 and 8B2 illustrate an embodiment of the invention in which an integrated vehicle navigation unit that includes GPS receivers, a display and a map function, communicates with a radar detector. The connection to the radar detector may be wired as shown in FIG. 8B1 or wireless via a Bluetooth or other 802.x radio as shown in 8B2. In either case, an application in the navigation unit operates to generate alerts of radar when detected by the attached radar detector, and further communicates with a stored lookup table or map to suppress radar warnings in the event that a detected signal correlates to a rejectable signal, and to store false signal locations when identified by the user via the user interface of the navigation unit.

FIGS. 8C1 and 8C2 illustrates an embodiment similar to FIGS. 8B1 and 8B2 in which a dashboard GPS receiver, which includes GPS receivers, a display and a map function, communicates with a radar detector. Here again, the connection to the radar detector may be wired as shown in FIG. 8C1 or wireless via a Bluetooth or other 802.x radio as shown in 8C2. In either case, an application in the GPS unit generate alerts of radar when detected by the attached radar detector, and further communicates with a stored lookup table or map to suppress radar warnings in the event that a detected signal correlates to a rejectable signal, and to store false signal locations when identified by the user via the user interface of the GPS unit.

Figure 8D:
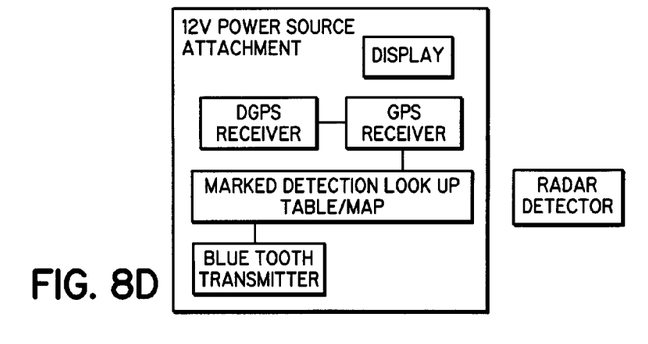
FIG. 8D illustrates an embodiment in which a 12 volt power source attachment including a display communicates wirelessly with a remote radar detector.

FIG. 8D illustrates an alternative embodiment of the invention in which a 12 volt power source attachment including GPS and DGPS receivers and a display, is coupled via a Bluetooth or other 802.x radio to a remote radar detector that includes Bluetooth functionality but does not include GPS functionality. One example of such a device is the radar detection unit sold by K40 Electronics under the brand name Calibre. In this embodiment, the power cord assembly communicates via Bluetooth or another 802.x wireless communication standard with the remote radar detector to acquire information about radar warnings, and the power cord assembly generates warnings on the display of the power source attachment. Further, the power source attachment communicates with a stored lookup table or map to suppress radar warnings in the event that a detected signal correlates to a rejectable signal, and may include a user interface such as a mute button, usable to store false signal locations when identified by the user via that user interface.

It will be appreciated that the embodiments illustrated above are exemplary and not limiting, and that other embodiments of the present invention fall within the scope of the appended claims. For example, the features shown in the power cord assembly may be integrated into an under-dash unit rather than a housing coupled to the power plug. The vehicle's built-in electronics may also incorporate any or all of the functions described. The invention is thus not limited to the embodiments disclosed but is defined by the following claims.

What is claimed is:

1. A police activity detector, comprising:
    a receiver for detecting electromagnetic signals generated in the context of police activity,
    a processor coupled to said receiver and evaluating electromagnetic signals received by said receiver to determine whether a warning is to be issued, the processor operating under control of software and/or data, and
    a first wireless device interface comprising a radio compliant with a wireless personal area network communication protocol,
    the processor interacting wirelessly with an external device via said first wireless device interface and connecting to a cellular device providing an Internet connection, the cellular device exchanging data with a remote server via said Internet connection,
    wherein the external device comprises a global positioning receiver, a display, and a second wireless device interface connectable to the first wireless device interface, the display generating alerts of radar when detected by the radar detector, and presenting a map representing the geographic location of the external device.

2. The detector of claim 1 wherein the processor receives signal information data from said remote server via said cellular device and Internet connection and uses the same in determining whether to issue a warning to a user of the detector.

3. The detector of claim 1 wherein the first wireless device interface is located in a housing that incorporates a cigarette lighter plug for obtaining 12 volt power from a cigarette lighter connector.

4. The detector of claim 1 further comprising at least one toggle button which may be activated by a user to indicate the presence of police activity at a current position.

5. A position-responsive police activity detector upgrade device, for use with a radar detector having a power and data connection, the radar detector receiving electrical power and communicating data over the connection including at least an indication of an alert generated upon detection of police radar, and the radar detector responding to data received over the connection including at least a muting signal for muting of an alert, the upgrade device comprising
    a housing that incorporates a cigarette lighter plug for obtaining 12 volt power from a cigarette lighter socket,
    a power and data connection for connection to a radar detector power and data connection,
    a communications connection for communicating with a mobile telephone, to cause the remote telephone to store information regarding a radar encounter in a remote database via cellular communication,
    the upgrade device including circuitry coupling power obtained from said cigarette lighter connector to a connected radar detector, receiving an indication of an alert from a connected radar detector, and providing a signal to a mobile telephone via said communications connection to a mobile telephone in response to an indicated alert.

6. The detector upgrade device of claim 5 wherein upon indication of an alert generated by a radar detector, said upgrade device causes said mobile telephone to store a current location in said remote database.

7. The detector upgrade device of claim 5 wherein the upgrade device receives an indication of police activity from a user of the device and provides a signal to the mobile telephone via said communications connection to cause said mobile telephone to store a current location in said remote database.

8. The detector upgrade device of claim 5 wherein the communications connection is a wireless connection complying with a personal area network communication protocol.

9. The detector upgrade device of claim 5 wherein the communication interface is a wired connection.

10. The detector upgrade device of claim 9 wherein the communication interface is a serial connection.

11. The detector upgrade device of claim 10 wherein the communication interface is a USB connection.

* * * * *